United States Patent [19]

Preston, Jr.

[11] Patent Number: 4,641,351
[45] Date of Patent: Feb. 3, 1987

[54] LOGICAL TRANSFORM IMAGE PROCESSOR

[76] Inventor: Kendall Preston, Jr., 5701 E. Glenn St., Bldg. 36, Tucson, Ariz. 85712

[21] Appl. No.: 634,261

[22] Filed: Jul. 25, 1984

[51] Int. Cl.⁴ .............................................. G06K 9/00
[52] U.S. Cl. .......................................... 382/6; 382/27; 364/414; 340/747
[58] Field of Search ............... 382/6, 27, 34; 364/414; 340/747, 729, 703

[56] References Cited

U.S. PATENT DOCUMENTS

| | | | |
|---|---|---|---|
| 4,395,698 | 7/1983 | Sternberg et al. | 382/27 |
| 4,395,700 | 7/1983 | McCubbrey et al. | 382/27 |
| 4,414,685 | 11/1983 | Sternberg | 382/27 |
| 4,498,080 | 2/1985 | Culver | 340/703 |
| 4,543,660 | 9/1985 | Maeda | 382/27 |

*Primary Examiner*—Anthony V. Ciarlante
*Attorney, Agent, or Firm*—Harry M. Weiss & Associates

[57] ABSTRACT

A voxel of a scene is central to a neighborhood of twelve voxels disposed at corners of a tetradecahedron. A signal representation of a processed image of the central voxel is provided in response to a comparison of a signal representation of the central voxel and the neighborhood to a signal representation of an array of voxels.

20 Claims, 10 Drawing Figures

LOGICAL TRANSFORM IMAGE PROCESSOR

BACKGROUND OF THE INVENTION

1. Field of Invention

This invention is related generally to logical transform processors, and more specifically, to a logical transform processor that maps a three dimensional structure and surrounding space into an image that can be altered.

2. Description of the Prior Art

A planar image, such as one displayed on a cathode ray tube (CRT), is almost always regarded as being two dimensional. However, as explained hereinafter, what appears to be a three dimensional image may be made from a plurality of two dimensional images.

A CRT display of an image of a ball may be made by first displaying an image of a slice of the ball in a plane farthest from an observer. Next, a slice in the interior of the ball in a plane closer to the observer is displayed. In a similar manner, images of slices of the interior of the ball in planes of decreasing distance from the observer are displayed. When the images of the slices are displayed at a suitable rate, the observer sees what appears to be a three dimensional image of the ball.

A three dimensional image may either remain unchanged or be altered via computer processing. An example of the unchanged three dimensional image is in the field of computed tomography where a three dimensional image of an organ of an animal is provided from images in selected planes.

An example of the altered three dimensional image is in the field of computer graphics. A CRT display of a three dimensional image of a building may be altered to study how the building looks with the sun at selected elevations. Typically, the image of the building is divided into a grid structure to define a plurality of polygonal regions, each having a desired shade of grey. However, the image of the building may have an undesired patchwork appearance.

Another example of the altered three dimensional image is in the field of neurology. A CRT display of a three dimensional image of a neural network of a person or an animal may be altered by a computer process, known as skeletonizing, to facilitate the tracing of the network.

A typical three dimensional image of a scene includes a structure and surrounding space. The scene is divided into a multiplicity of least resolvable elements, known as voxels. Accordingly, a signal representation of the typical image is comprised of signals representative of all of the voxels comprising the scene. More particularly, a signal representative of an exemplary voxel is either a logic "1" signal or a logic "0" signal when the exemplary voxel is included in the structure or the space, respectively.

The processing of the signal representative of the exemplary voxel is often equivalent to comparing an array formed by the exemplary voxel and voxels proximal thereto (referred to as neighbors hereinafter) to all possible arrays. Based upon the comparison, an image of the exemplary voxel may, for example, be shaded to a selected one of a plurality of shadings.

One type of array is comprised of voxels that define a cube. Twenty-six voxels are arranged at midpoints and ends of line segments comprising edges of the cube. One voxel is at the center of the cube. Another type of array is comprised of voxels that define an octahedron. Eighteen voxels are arranged at ends of line segments comprising edges of the octahedron. One voxel is at the center of the octahedron.

All possible cubic arrays are defined by $2^{27}$ combinations of logic signals. All possible octahedral arrays are defined by $2^{19}$ combinations of logic signals. The number of combinations of signals to define all possible arrays of either the cube or the octahedron are undesirably large.

There has heretofore been a need to define a neighborhood that is easily adapted for computer processing and to implement computer processing of a three dimensional image of a multiplicity of voxels.

SUMMARY OF THE INVENTION

An object of the present invention is to implement computer processing of a three dimensional image.

Another object of the present invention is to designate subfields in a scene to facilitate computer processing of a three dimensional image thereof.

According to the present invention, a computer conditions a group of comparison memory elements to transmit a signal to said computer in response to an address code representative of a voxel and its neighbors defining a selected pattern; a plurality of scene memory units are respectively loaded by said computer with a plurality of signal representations of an unprocessed image of a scene; an address code representative of the voxel and its neighbors is provided by the scene memory units to said comparison memory.

Apparatus of the present invention is easily and economically operated, in conjunction with a digital computer, to process a three dimensional image.

The foregoing and other objects, features and advantages of the invention will be apparent from the following, more particular description of the preferred embodiment of the invention as illustrated in the accompanying drawing.

DESCRIPTION OF THE PREFERRED EMBODIMENT

The preferred embodiment is a description of apparatus for processing a three dimensional image of a scene. The scene is comprised of four types of layers of voxels. As explained hereinafter, the four types have a known spatial relationship to each other. Additionally, two voxels are said to be connected when they are adjacent each other. The distance between connected voxels is predetermined and invariant.

The description includes two exemplary processes. A first process, known as skeletonizing, causes an image of each structure in an unprocessed image to be transformed into an image of a chain of connected voxels in a processed image. A second process is a shading of the unprocessed image.

An essential feature of skeletonizing is that each voxel be designated as being in one of six subfields. The signal representations of images of the subfields are processed sequentially. In other words, signals representative of all of the images of voxels of one subfield are processed before a signal representative of an image of a voxel of another subfield is processed. Without the sequential processing, the image of the chain of voxels may not appear in the processed image.

Figure 2:
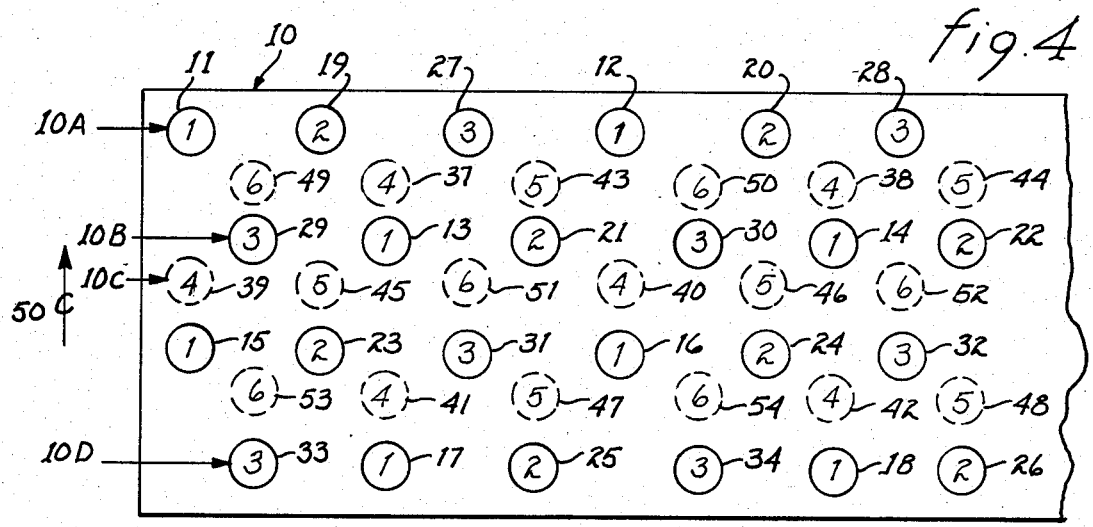
FIG. 2 is a plan view of a portion of a first type of layer of voxels.

As shown in FIG. 2, a layer 10 of a first type includes voxels 11–34 arranged in rows 10A, 10B, 10C, 10D. The voxels 11–34 are in three subfields. More particularly, the voxels 11–18, 19–26, 27–34 are in a first, second, and third subfields and are noted with the numerals one, two, and three, respectively.

Figure 3:
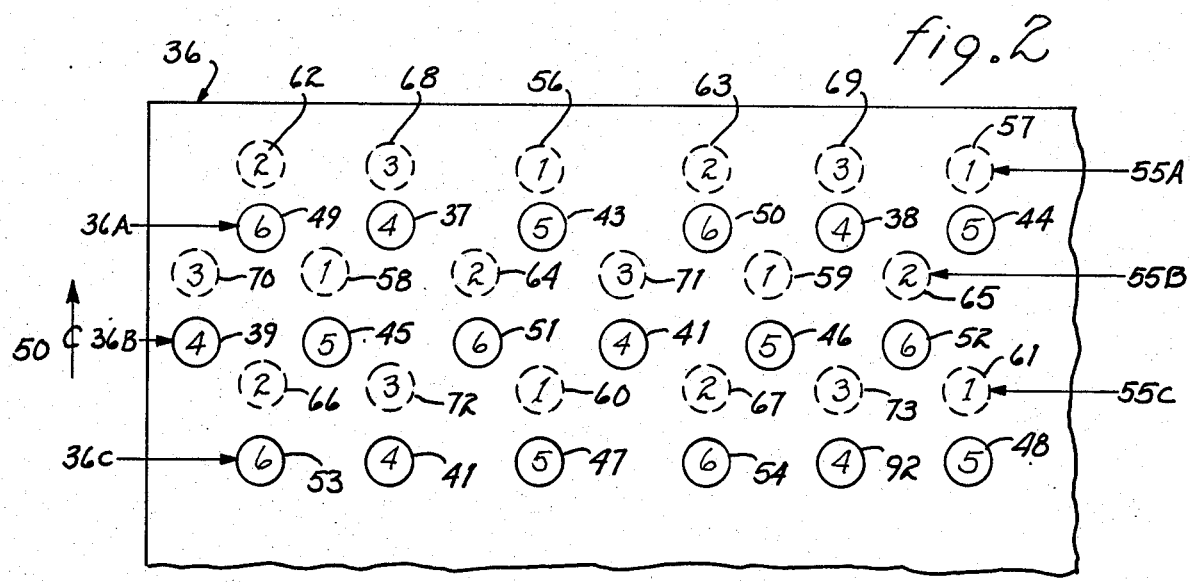
FIG. 3 is a plan view of a portion of a second type of layer of voxels.

As shown in FIG. 3, a layer 36 of a second type includes voxels 37–54 arranged in rows 36A, 36B, 36C. In a manner corresponding to the voxels 11–34, the voxels 37–54 are in three subfields. More particularly, the voxels 37–42, 43–48, 49–54 are in a fourth, fifth, and sixth subfields and are noted with the numerals four, five, and six, respectively.

The layer 10 (FIG. 2) forms an exterior boundary of the scene. The interior face of the layer 10 is disposed adjacent a first face of the layer 36. Moreover, the voxels 37–42, 43–48, 49–54 (shown in broken lines) are respectively displaced, by a displacement distance, in a direction of an arrow 50 from alignment with the voxels 13–18, 21–26, 30–34.

The voxels 37–42, 43–48, 49–54 are each at the center of an equilateral triangle formed by projections of three of the voxels 11–34 onto the layer 36. Therefore, the displacement distance is in accordance with a relationship given as:

$$D = \sqrt{3}\; P/4$$

where P=the predetermined distance between connected voxels; and D=the displacement distance from alignment.

Figure 4:
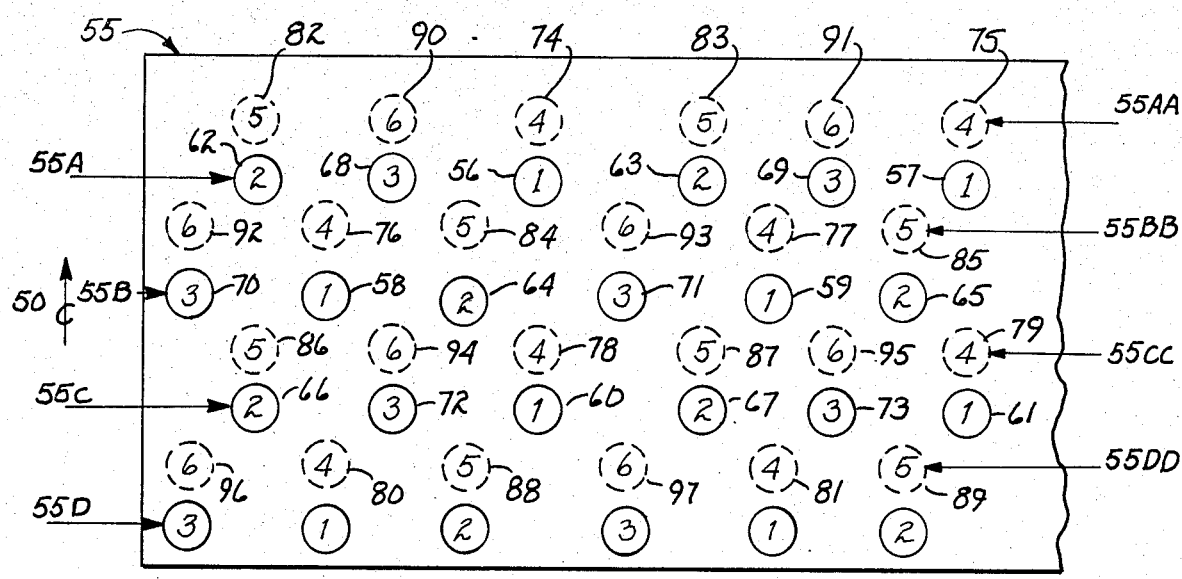
FIG. 4 is a plan view of a portion of a third type of layer of voxels.

As shown in FIG. 4, a layer 55 of a third type includes voxels 56–73 arranged in rows 55A, 55B, 55C. The layer 55 additionally includes a row 55D. A first face of the layer 55 is disposed adjacent the second face of the layer 36 (FIG. 3).

Like the voxels 11–34, the voxels 56–73 are in three subfields. More particularly, the voxels 56–61, 62–67, 68–73 are in the first, second, and third subfields and are noted with the numerals one, two, and three, respectively. Moreover, the voxels 56–61, 62–67, and 68–73 are respectively displaced, by the displacement distance, in the direction of the arrow 50, from alignment with the voxels 43–48, 49–54, 37–42.

The second face of the layer 55 (FIG. 4) is disposed adjacent a fourth type of layer which includes voxels 74–97 (shown in broken lines) arranged in rows 55AA, 55BB, 55CC, 55DD. Like the voxels 37–54, the voxels 74–97 are in three subfields. More particularly, the voxels 74–81, 82–89, 90–97 are in the fourth, fifth, and sixth subfields and are noted with the numerals four, five, and six, respectively. Moreover, the voxels 74–79, 82–87, 90–95 are respectively displaced, by the displacement distance, in the direction of the arrow 50, from alignment with the voxels 56–61, 62–67, 68–73.

An interior layer of the first and the third type is sandwiched between interior layers of the second and the fourth type. Therefore, an interior layer of the second and fourth type is sandwiched between interior layers of the first and third type. The disposition of the layers described hereinbefore is exemplary of the disposition of all layers of the scene.

As explained hereinafter, the sandwiching and the displacements cause each voxel (except those near an exterior boundary of the scene) to be central to a neighborhood of twelve voxels respectively disposed at corners of a tetradecahedron (a fourteen sided polyhedron). Moreover, a central voxel is of a subfield different from the subfields of the voxels in its twelve voxel neighborhood. It should be understood that a voxel near an exterior boundry has a twelve voxel neighborhood comprised of voxels of the scene and virtual voxels that are not part of the scene. A virtual voxel is represented by a logic "0" voxel signal.

A tetradecahedron has only twelve corners. Therefore, $2^{12}$ combinations of logic signals are representative of all possible neighborhoods ($2^{13}$ combination for a central voxel and its neighborhood). The $2^{13}$ combinations of logic signals is much less than the number of combinations needed to represent an array of the prior art.

Figure 5:
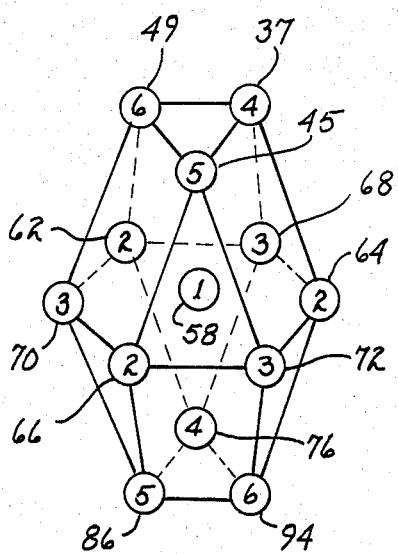
FIGS. 5-10 are perspective views of central voxels and their neighborhoods.
Figure 6:
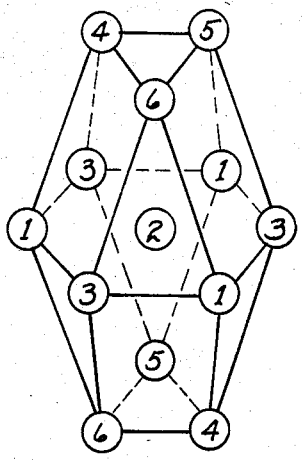
Figure 7:
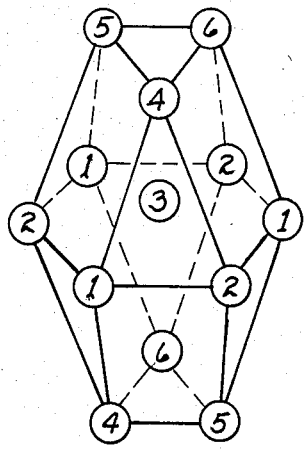
Figure 8:
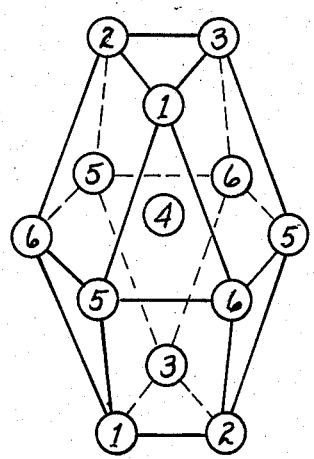
Figure 9:
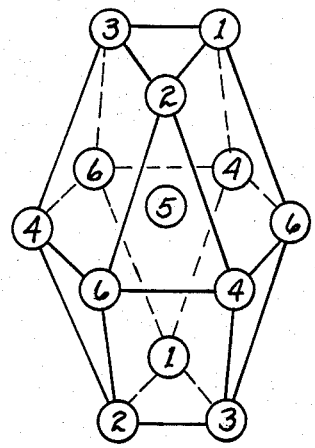
Figure 10:
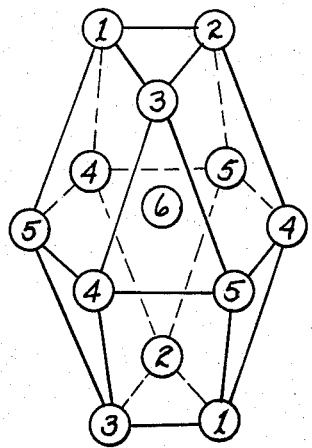

As shown in FIG. 5, the voxel 58 is central to a neighborhood formed by the voxels 37, 35, 49, 62, 64, 66, 68, 70, 76, 84, 90; the neighborhood has a subfield distribution that does not include the first subfield (the subfield that includes the voxel 58). All other voxels of the first subfield are central to a neighborhood with a subfield distribution similar to that of the neighborhood of the voxel 58. Hence, FIG. 5 is a showing of a prototype neighborhood of a central voxel of the first subfield. Correspondingly, FIGS. 6–10 are showings of prototype neighborhoods of central voxels of the second, third, fourth, fifth, and sixth subfields, respectively. If should be understood that the adjacent voxels of a neighborhood are connected and, therefore, are separated by the predetermined distance. Additionally, a central voxel is connected to all neighboring voxels and, therefore, is separated from a neighboring voxel by the predetermined distance.

Figure 1:
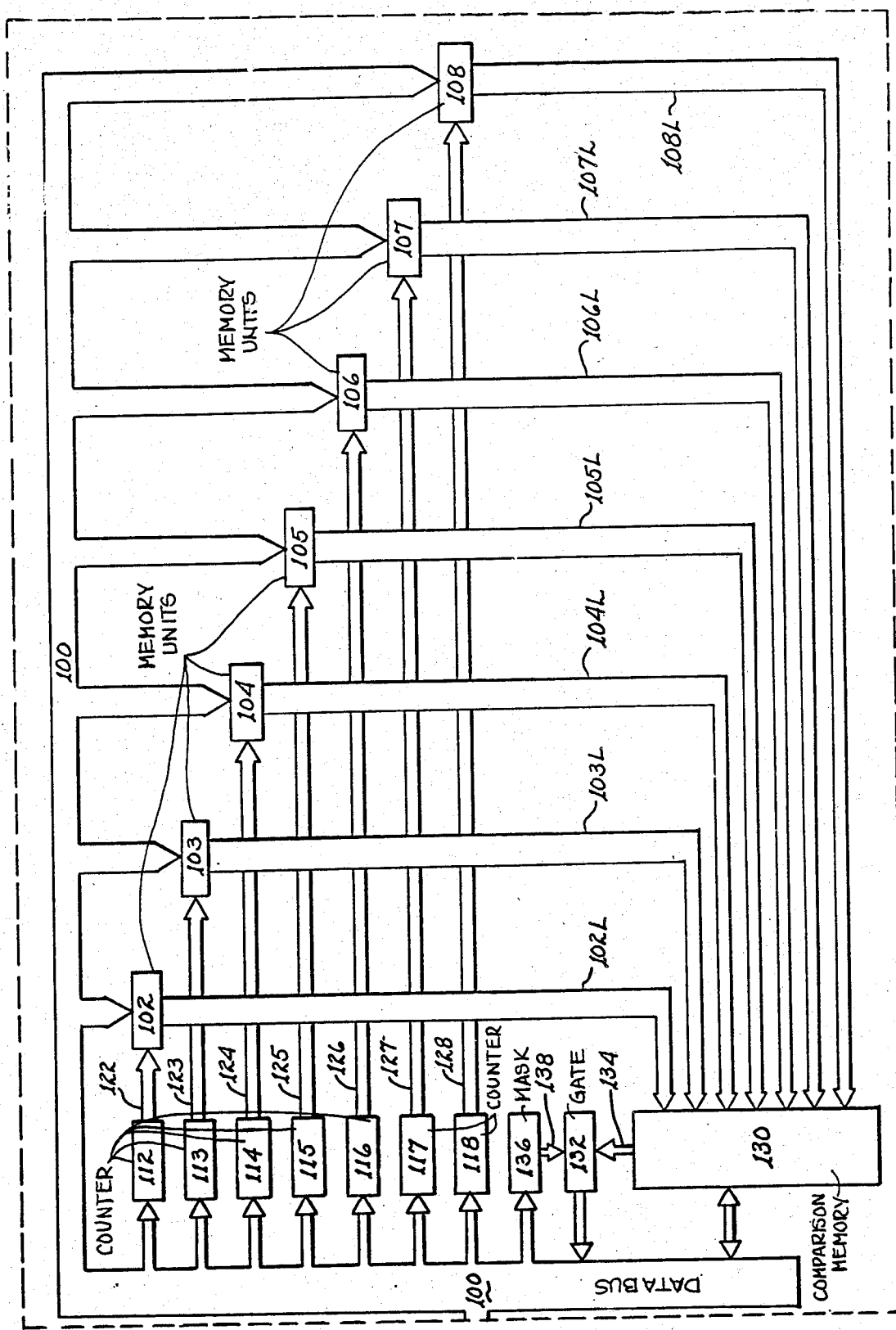
FIG. 1 is a block diagram of the preferred embodiment of the present invention.

As shown in FIG. 1, the image of the scene is processed by a host digital computer 98 connected to a processing circuit 99 through a data bus 100. Additionally, signal lines, such as enable lines and clock lines, connect the computer 98 to the circuit 99. These additional lines are not shown in order to present the teachings of the present invention without unnecessary details that could be confusing.

The computer 98 provides a signal representation of the image of the scene to the scene memory units 102–108 of the circuit 99 through the data bus 100. The scene memory units 102–108 are of a random access type that provides voxel signals representative of an image of a row of voxels in response to a memory address signal. Random access memory units are well known to those skilled in the art.

The scene memory units 102–108 are respectively connected to memory address counters 112–118 of the circuit 98 through signal lines 122–128. The counters 112–118 are respectively loaded by the computer 98 with seven memory address signals of a first group. The first group of memory address signals are respectively provided by the counters 112–118 to the scene memory units 102–108. In response to the first group of memory address signals, the scene memory units 102–108 respectively provide a group of voxel signals representative of images of a first seven rows of voxels. As explained hereinafter, the scene memory unit 105 provides voxel signals that may be altered in the skeletonizing process.

After a processing interval, the counters 112-118 are incremented. The incrementing causes the counters 112-118 to provide a second group of memory address signals representative of a second seven memory addresses, thereby causing the scene memory units 102-108 to provide a group of voxel signals representative of images of a second seven rows of voxels. In a similar manner, the counters 112-118 are incremented to provide successive groups of memory address signals.

When, for example, the scene memory unit 105 provides voxel signals representative of an image of the row 55B (FIGS. 3 and 4), the scene memory units 102-104 respectively provide voxel signals representative of images of the rows 36A, 36B, 55A. Additionally, the scene memory units 106-108 respectively provide voxel signals representative of images of the rows 55C, 55BB, 55CC. Therefore, voxel signals representative of images of the neighborhoods of all of the voxels of the row 55B are provided by the scene memory units 102-108.

When the counters 112-118 are incremented, the voxel signals representative of the image of the row 55C are provided by the scene memory unit 105. Additionally, voxel signals representative of the images of the rows 36B, 36C, 55B, 55D, 55CC and 55DD are provided by the scene memory units 102-104, 106-108, respectively. Therefore, the voxel signals representative of images of the neighborhoods of all of the voxels of the row 55C are provided by the scene memory units 102-108.

In this embodiment, memory address signals always cause the scene memory units 102-108 to provide a group of voxel signals representative of an image of a row of voxels and the neighborhood of every voxel in that row. When the counters 112-118 are incremented a number times equal to one less than the number of rows in the scene, signal representations of images of all of the voxels of the scene and their neighborhoods have been provided by the scene memory units 102-108.

The scene memory units 102-108 are additionally connected to a group of comparison memory elements 130 of the circuit 99 through pluralities of signal lines 102L-108L, respectively. The comparison memory 130 is comprised of as many random access memory units as there are voxels in a row. The memory units of the comparison memory 130 each have thirteen address code signal lines.

The groups of voxel signals are provided to the comparison memory 130 via the lines 102L-108L. A group of voxel signals comprises an address code to the comparison memory 130. Moreover, each memory unit of the comparison memory 130 is provided with a portion of the address code representative of an image of a central voxel and its neighborhood.

The comparison memory 130 is connected to the computer 98 through the data bus 100. The computer 98 provides to the comparison memory 130 groups of pattern signals respectively representative of selected patterns of central voxels and their neighborhoods. The pattern signals are stored by the memory units of the comparison memory 130.

In response to a portion of the address code corresponding to a group of pattern signals, the comparison memory 130 transmits a voxel signal that has been altered in accordance with the skeletonizing process. In other words, the pattern signals condition the comparison memory 130 to transmit a processed voxel signal. The alteration of voxel signals in accordance with the skeletonizing process is fully explained hereinafter.

When an unprocessed image of an exemplary central voxel is represented by a logic "0" central voxel signal, the central voxel signal is unaltered. When the central voxel signal is a logic "1", it is altered except when:

a. the image of the neighborhood of the exemplary voxel includes two or more groups of disconnected voxels represented by a logic "1" voxel signal; or b. the image of the neighborhood of the exemplary voxel includes a single voxel represented by the logic "1" voxel signal.

The alteration causes the image of the exemplary voxel to be represented by the logic "0" central voxel signal.

The comparison memory 130 is connected to a subfield gate 132 by a plurality of signal lines 134. Additionally, the subfield gate 132 is connected to a subfield mask 136 through a plurality of signal lines 138. The subfield gate 132 and the subfield mask 136 are both connected to the computer 98 through the data bus 100.

The subfield mask 136 is a storage register of a type well known in the art. For reasons explained hereinafter, whenever the counters 112-118 are incremented, the computer 96 provides a plurality of subfield enable signals which are stored by the subfield mask 136. The stored subfield enable signals are provided to the subfield gate 132.

Processed signal representations of images of central voxels are transmitted to the subfield gate 132 by the comparison memory 130. In concurrent response to the stored subfield enable signals and the processed signals, the subfield gate 132 provides to the computer 98 processed signals representative of processed images of voxels of a selected subfield. The computer 98 stores the processed signals.

It should be understood that the scene memory unit 105 may or may not provide on a given one of the lines 105L a voxel signal representative of an image of a voxel of a given subfield. Although, for example, the scene memory unit 105 provides a representation of an image of the voxel 77 on the given signal line in response to one memory address signal, a representation of the image of the voxel 59 is provided in response to another memory address signal. The voxels 77, 59 are in the fourth and first subfields, respectively. Therefore subfield enable signals, corresponding to the subfields represented by the voxel signals provided by the scene memory 105, are provided by the computer 98 to the subfield mask 136 whenever the counters 112-118 are incremented.

After signals representative of all of the images of the voxels of the selected subfield have been processed and stored, the computer 98 loads the processed signals into the scene memory units 102-108 to replae the unprocessed voxel signals representative of the images of the voxels of the selected subfield. Additionally, the computer 98 reloads the counters 112-118 with the first group of seven memory address signals. Thereafter, images of voxels of another subfield are processed and stored. In a similar manner, images of voxels of all other subfields are processed and stored. The processing is iterated until none of the voxel signals are altered by the processing.

In one alternative embodiment, a plurality of subfield masks store subfield enable signals that are unchanged during the processing. The subfield masks are connected to the subfield gates 132 via a multiplexer. The multiplexer operates to selectively couple one of the plurality of subfield masks to the subfield gate 132 in response to a signal from a counter that is incremented concurrently with the incrementing of the counters 112–118.

In another alternative embodiment, the number of voxels of a row exceeds the number of voxel signals that are provided by each of the scene memory units 102–108. The scene memory units provide signal representations of images of portions of rows of voxels. However, all portions of rows are provided by incrementing the counters 112–118. Thus there is explained hereinbefore an exemplary skeletonizing of an image of a scene.

When light is transmitted towards an exemplary structure of a scene from a source, the shading of an image of a given voxel depends upon whether the given voxel is part of the exemplary structure, structural features adjacent the given voxel and upon the location and intensity of the source. The structural features adjacent the given voxel comprise its neighborhood.

It should be understood that shading is only associated with voxels on the surface of the exemplary structure. When, for example, the given voxel is part of the space surrounding the exemplary structure, there is no shading. Similarly, when the given voxel is internal to the exemplary structure, there is no shading. However, when the given voxel is on the surface of the exemplary structure, the shading is related to which of its neighboring voxels are part of the exemplary structure and upon the source, as stated hereinbefore. Since there are $2^{12}$ combinations of neighbors, there are potentially $2^{12}$ gradations of shading.

When the image of the scene is to be shaded, a shading code is transmitted from the comparison memory 130 to the computer 98 in response to a portion of the address code corresponding to a group of stored pattern signals.

It should be understood that a human being can only discern approximately sixty shades of grey. Therefore, only sixty combinations of logic signals represent all discernible shades of grey. When the shading codes for the image of each of the voxels is transmitted to the computer 98, conventional apparatus may be used in conjunction with the computer 98 to modulate the Z axis of a conventional CRT and provide a shaded image of the scene.

In another alternative embodiment, a plurality of circuits, similar to the circuit 99 are used to respectively process portions of a large image. A signal representation of the processed large image is stored in a computer which modulates the Z axes of a CRT with a plurality of electron guns. The conventional CRT may replace the multi-gun CRT by storing a signal representation of visible portions of the large image in a refresh memory. The signals stored in the refresh memory modulates the Z axis of the conventional CRT.

While the invention has been particularly shown and described with reference to a preferred embodiment thereof, it should be understood by those skilled in the art that changes in form and detail may be made therein without departing from the spirit and scope of the invention.

I claim:

1. An apparatus for processing at least one central voxel in a neighborhood of voxels of a multi-dimensional scene of at least three dimensions, comprising:

acquisition means for acquiring a first plurality of signals, each of said signals representative of a voxel, a plurality of said voxels representative of a multi-dimensional scene of at least three dimensions, said plurality of said voxels arranged in rows, said voxels equally spaced along said rows, said rows in parallel to each other;
   storage means for storing said first plurality of signals representing said multi-dimensional scene;
   first retrieval means for retrieving at least one of said first plurality of said signals representative of at least one central voxel;
   second retrieval means for retrieving a second plurality of said signals representative of at least one multi-dimensional neighborhood of at least three dimensions around said at least one central voxel, said second plurality of said signals being substantially a subset of said first plurality of said signals;
   pattern means for providing a plurality of pre-determined pattern signals representative of an plurality of pre-determined multi-dimensional neighborhoods of at least three dimensions around at least one pre-determined central voxel;
   comparison means for comparing said second plurality of said signals representative of said multi-dimensional neighborhood of at least three dimensions around said at least one central voxel to said pre-determined pattern signals;
   processing means for processing said at least one central voxel in response to said comparison means; and
   transmitting means for transmitting said at least one processed central voxel.

2. The apparatus for processing at least one central voxel in a neighborhood of voxels of a multi-dimensional scene of at least three dimensions, according to claim 1, wherein said storage means comprises a configuration of random access memory units, said configuration of said random access memory units is suitable for simultaneously providing all elements of said second plurality of said signals representative of said multi-dimensional neighborhood around said central voxel.

3. The apparatus for processing at least one central voxel in a neighborhood of voxels of a multi-dimensional scene of at least three dimensions, according to claim 2, wherein said each of said signals representative of a voxel is a binary signal.

4. The apparatus for processing at least one central voxel in a neighborhood of voxels of a multi-dimensional scene of at least three dimensions, according to claim 2, wherein said signals representative of said rows of said voxels are represented by multi-bit words.

5. The apparatus for processing at least one central voxel in a neighborhood of voxels of a multi-dimensional scene of at least three dimensions, according to claim 4, wherein voxels of said neighborhood are disposed at corners of a tetradecahedron.

6. The apparatus for processing at least one central voxel in a neighborhood of voxels of a multi-dimensional scene of at least three dimensions, according to claim 5, wherein said configuration of said random access memory units comprises seven said random access memory units.

7. The apparatus for processing at least one central voxel in a neighborhood of voxels of a multi-dimensional scene of at least three dimensions, according to claim 6, wherein said each voxel of said multi-dimensional neighborhood is included in one of a plurality of subfields, with said each voxel being in a subfield different from the subfields of adjacent voxels.

8. The apparatus for processing at least one central voxel in a neighborhood of voxels of a multi-dimensional scene of at least three dimensions, according to claim 7, additionally comprising:
a subfield mask register that stores an enable signal; and
a subfield gate, connected to said subfield mask and to said comparison means, that transmits said processed voxel signal when it is representative of a processed image of a voxel of a selected subfield.

9. The apparatus for processing at least one central voxel in a neighborhood of voxels of a multi-dimensional scene of at least three dimensions, according to claim 2, wherein said one of said signals representative of said central voxel is altered in response to a correspondence of said second plurality of said signals representative of said multi-dimensional neighborhood to one of said group of said pre-determined pattern signals.

10. The apparatus for processing at least one central voxel in a neighborhood of voxels of a multi-dimensional scene of at least three dimensions, according to claim 9, wherein
said comparison means comprises a random access memory unit; and
said processing means comprises address construction means for constructing a memory address suitable for input into said comparison means, said address construction means constructing said memory address from said second plurality of said signals representative of said multi-dimensional neighborhood around said central voxel.

11. The apparatus for processing at least one central voxel in a neighborhood of voxels of a multi-dimensional scene of at least three dimensions, according to claim 10, wherein said transmitting means transmits multi-bit signals representative of a shade of grey of the image of said central voxel in response to said comparison means.

12. The apparatus for processing at least one central voxel in a neighborhood of voxels of a multi-dimensional scene of at least three dimensions, according to claim 9, wherein
said comparison means comprises a random access memory unit; and
said processing means comprises address construction means for constructing a memory address suitable for input into said comparison means, said address construction means constructing said memory address from said one of said signals representative of said central voxel and said second plurality of said signals representative of said multi-dimensional neighborhood around said central voxel.

13. The apparatus for processing at least one central voxel in a neighborhood of voxels of a multi-dimensional scene of at least three dimensions, according to claim 12, wherein said transmitting means transmits multi-bit signals representative of a shade of grey of the image of said central voxel in response to said comparison means.

14. A method for processing at least one central voxel in a neighborhood of voxels of a multi-dimensional scene of at least three dimensions, comprising the steps of:
providing a signal representing a central voxel;
providing a plurality of signals representing a plurality of voxels, said plurality of voxels forming a multi-dimensional neighborhood of at least three dimensions surrounding said central voxel;
storing multiple copies of said signal representing a central voxel in a storage means;
storing multiple copies of said signals representing a plurality of voxels in a storage means;
subdividing said signals into pre-determined subfields;
providing a plurality of pre-determined patterns of multi-dimensional neighborhoods of at least three dimensions around a pre-determined central voxel;
comparing said plurality of signals representing said plurality of voxels to each of said plurality of pre-determined patterns of said multi-dimensional neighborhoods of at least three dimensions;
modifying said central voxel in response to said comparing step; and thereafter
making available said modified central voxel.

15. The method for processing at least one central voxel in a neighborhood of voxels of a multi-dimensional scene of at least three dimensions according to claim 14, wherein
said step of providing a signal representing a central voxel comprises providing a binary signal representing a central voxel;
said step of providing a plurality of signals representing a plurality of voxels comprises providing a plurality of binary signals representing a plurality of voxels; and
said steps of storing multiple copies comprises writing binary information into random access memory units.

16. The method for processing at least one central voxel in a neighborhood of voxels of a multi-dimensional scene of at least three dimensions according to claim 15 wherein said step of providing a plurality of pre-determined patterns of said multi-dimensional neighborhoods of at least three dimensions comprises storing pre-determined values representing pre-determined modified central voxels into a random access memory unit at addresses within said random access memory unit, said addresses being pre-determined by a binary representation of said plurality of pre-determined patterns of multi-dimensional neighborhoods of at least three dimensions around said pre-determined central voxel.

17. The method for processing at least one central voxel in a neighborhood of voxels of a multi-dimensional scene of at least three dimensions according to claim 16 wherein
said step of comparing said plurality of signals representing said plurality of voxels to each of said plurality of pre-determined patterns of said multi-dimensional neighborhoods of at least three dimensions comprises constructing a target address from said plurality of binary signals representing a plurality of voxels forming a multi-dimensional neighborhood surrounding said central voxel;
said step of modifying said central voxel comprises retrieving the contents of said random access memory unit at said target address; and
said step of making available said modified central voxel comprises presenting said retrieved contents of said random access memory unit at said target address as the modified central voxel.

18. The method for processing at least one central voxel in a neighborhood of voxels of a multi-dimensional scene of at least three dimensions according to claim 15 wherein said step of providing a plurality of pre-determined patterns of said multi-dimensional neighborhoods of at least three dimensions comprises storing pre-determined values representing pre-determined modified central voxels into a random access memory unit at addresses within said random access memory unit, said addresses being pre-determined by a binary representation of said central voxel and a binary representation of said plurality of pre-determined patterns of multi-dimensional neighborhoods of at least three dimensions around said pre-determined central voxel.

19. The method for processing at least one central voxel in a neighborhood of voxels of a multi-dimensional scene of at least three dimensions according to claim 18 wherein said step of comparing said plurality of signals representing said plurality of voxels to each of said plurality of pre-determined patterns of said multi-dimensional neighborhoods of at least three dimensions comprises constructing a target address from said binary signal representing said central voxel and said plurality of binary signals representing a plurality of voxels forming a multi-dimensional neighborhood surrounding said central voxel;

said step of modifying said central voxel comprises retrieving the contents of said random access memory unit at said target address; and said step of making available said modified central voxel comprises presenting said retrieved contents of said random access memory unit at said target address as the modified central voxel.

20. A method for processing at least one central voxel in a neighborhood of voxels of a multi-dimensional scene of at least three dimensions, comprising the steps of:

providing a signal representing a central voxel;

providing a plurality of signals representing a plurality of voxels, said plurality of voxels forming a multi-dimensional neighborhood of at least three dimensions surrounding said central voxel;

storing multiple copies of said signal representing a central voxel in a storage means;

storing multiple copies of said signals representing a plurality of voxels in a storage means;

subdividing said signals into pre-determined subfields;

providing a plurality of pre-determined patterns of multi-dimensional neighborhoods of at least three dimensions around a pre-determined central voxel;

comparing said plurality of signals representing said plurality of voxels to each of said plurality of pre-determined patterns of said multi-dimensional neighborhoods of at least three dimensions;

computing a multi-bit value representative of a shade of grey of said central voxel in response to said comparing step; and thereafter making available said multi-bit value representative of a shade of grey of said central voxel.

* * * * *